No. 740,088. PATENTED SEPT. 29, 1903.
H. CHRISMAN.
PROPORTIONAL METER.
APPLICATION FILED FEB. 20, 1903.
NO MODEL. 2 SHEETS—SHEET 1.

WITNESSES: James C. Herron. S. R. Bell.

INVENTOR, Horace Chrisman, by J. Snowden Bell, Att'y.

No. 740,088. PATENTED SEPT. 29, 1903.
H. CHRISMAN.
PROPORTIONAL METER.
APPLICATION FILED FEB. 20, 1903.
NO MODEL. 2 SHEETS—SHEET 2.

WITNESSES
INVENTOR

No. 740,088. Patented September 29, 1903.

UNITED STATES PATENT OFFICE.

HORACE CHRISMAN, OF PITTSBURG, PENNSYLVANIA, ASSIGNOR TO PITTS-BURGH METER COMPANY, OF PITTSBURG, PENNSYLVANIA, A CORPORATION OF PENNSYLVANIA.

PROPORTIONAL METER.

SPECIFICATION forming part of Letters Patent No. 740,088, dated September 29, 1903.

Application filed February 20, 1903. Serial No. 144,235. (No model.)

*To all whom it may concern:*

Be it known that I, HORACE CHRISMAN, of Pittsburg, in the county of Allegheny and State of Pennsylvania, have invented a certain new and useful Improvement in Proportional Meters, of which improvement the following is a specification.

My invention relates to appliances for measuring, indicating, and recording the volume of fluid passing through a conduit or main of the class known as "proportional" meters, in which a determined fractional part of the fluid supplied is passed through and measured by a meter of correspondingly-reduced capacity and the total volume of the fluid passing through the conduit or main is computed as a known multiple of that which passes through said fractionally-measuring meter.

The object of my invention is to provide a proportional meter in which simplification and economy of construction and facility and accuracy of operation shall be attained by a reduction in the number of working parts and the elimination of the articulated connections which have heretofore been generally employed.

To this end my invention, generally stated, consists in a combined valve and motor structure comprising a valve controlling the flow of unmeasured fluid, a valve controlling the flow of measured fluid, and pressure-plates subject to the pressure of the unmeasured and measured fluid, said structure being actuated in one direction by the conjoined pressures of the unmeasured and measured fluid and in the opposite direction by gravity.

My invention further consists in the combination of a valve and motor structure as aforesaid with inlet and outlet chambers having connections for sections of a supply-main and with a tally-meter and also in certain structural details.

The improvement claimed is hereinafter fully set forth.

Figure 1:
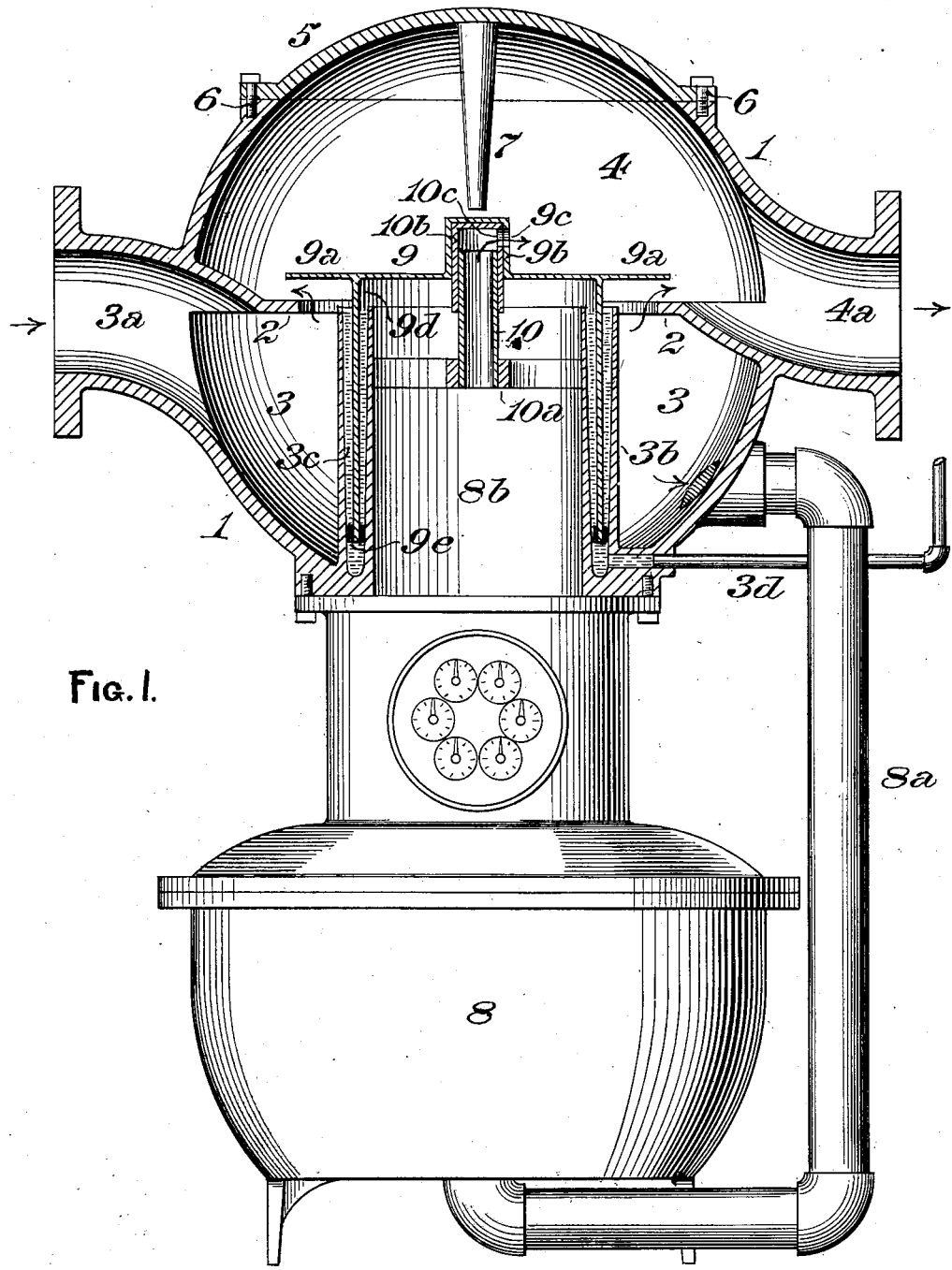
Figure 2:
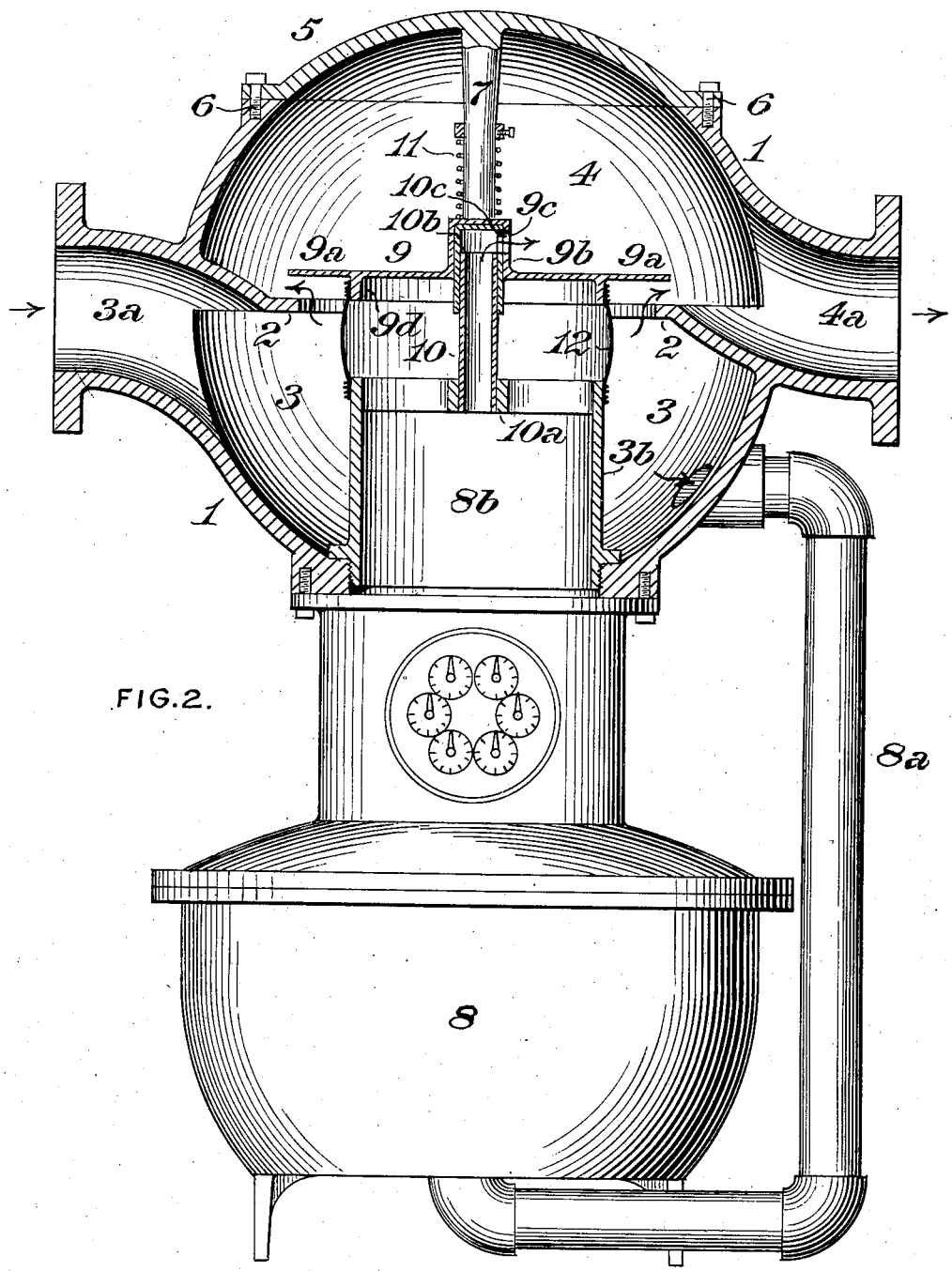

In the accompanying drawings, Figure 1 is a view, partly in elevation and partly in vertical central section, of a proportional meter, illustrating an application of my invention; and Fig. 2, a similar view illustrating modifications of structural detail.

In the practice of my invention, referring to the embodiment thereof shown in the drawings, I provide an inclosing casing 1, which is divided by a transverse partition 2, in which is formed a central opening, into an inlet-chamber 3 and an outlet-chamber 4. A lateral inlet passage or nozzle $3^a$, adapted for connection to a section of a fluid conduit or main, is formed upon the inlet-chamber, and a similar outlet passage or nozzle $4^a$ is formed upon the outlet-chamber. The outlet-chamber is provided with a removable cap 5, which is held in position by bolts 6 and carries a central stop 7 to limit the upward traverse of a valve and motor structure to be hereinafter described. The inlet-chamber 3 is open at its bottom, which is connected to a tally-meter 8 of any suitable and preferred construction and of proper capacity to measure a desired and determined fractional volume of fluid passing into the inlet-chamber, with which the tally-meter is connected by a supply-pipe $8^a$. The delivery-passage of the tally-meter opens into a meter delivery-chamber $8^b$, formed by a cylindrical wall $3^b$, projecting upwardly into the inlet-chamber.

Communication between the inlet and outlet passages of the casing is controlled and regulated by a combined valve and motor structure which is provided for the performance of the several functions of (a) a valve for controlling the flow of unmeasured fluid directly from the inlet to the outlet chamber, (b) a valve for controlling the flow of measured fluid from the tally-meter to the outlet-chamber, (c) a pressure-plate actuated to impart opening movement to said valves by the combined pressures of the unmeasured and measured volumes of fluid, and (d) a gravitating member for imparting closing movement to said valves.

The components of the structure referred to are a plate 9 $9^a$, which extends across the top of the meter delivery-chamber $8^b$ and the central opening in the partition 2 of the meter-casing 1, and a cylinder $9^b$, which extends upwardly from the central portion of the plate and is closed at its top and has a lateral port $9^c$ formed in its shell. The outer portion $9^a$ of the plate forms a direct-delivery valve which controls the flow of unmeasured fluid from the inlet to the outlet chamber of the meter and a pressure-plate which is acted upon upwardly or in direction to impart opening movement to said valve by the unmeasured fluid. The inner portion 9 of the plate, which is of greater area than the outer portion 9ª, forms a permanent partition between the meter delivery-chamber 8ᵇ and the outlet-chamber 4 and a pressure-plate which is acted upon in the same direction as the outer portion 9ª by the measured fluid. Within the central cylinder 9ᵇ there is secured a sleeve or bushing 10ᵇ, which fits truly and traverses vertically upon a delivery-pipe 10, leading out of the meter delivery-chamber, and is provided with a lateral port 10ᶜ, which coincides with the port 9ᶜ of the cylinder. The pipe 10 is open at its ends and is supported by a frame or bracket 10ª, fixed to the shell of the meter delivery-chamber. The laterally-ported cylinder 9ᵇ forms a meter delivery-valve which controls the flow of measured fluid from the meter delivery-chamber to the outlet-chamber 4.

The combined valve and motor structure above described is preferably formed of sheet metal, with its constituents rigidly secured one to the other, so as to form an integral structure, its aggregate weight being such as to enable it to act as a gravitating member in opposite direction to the pressures of fluid which act in an upward direction upon it. A supplemental weight may be added to it, if found desirable, or equivalently its tendency to downward movement may be increased by the application of a spring 11, as shown in Fig. 2.

It will be obvious that in all positions of the plate 9 9ª and connected valve-cylinder 9ᵇ communication between the inlet-chamber 3 and meter delivery-chamber 8ᵇ (except such as is permitted and controlled by the tally-meter) must be wholly and continuously prevented, and to this end a partition of such character as to be adapted to permit movement of the plate 9 9ª and valve-cylinder 9ᵇ and at the same time to maintain the required separation between the inlet-chamber and meter delivery-chamber is provided. In the specific embodiment of my invention which is exemplified in Fig. 1 said partition is in the form of a cylindrical shell 9ᵈ, which is connected at its top to the plate 9 9ª and projects downwardly therefrom into a fluid-seal chamber 3ᶜ, formed in the wall 3ᵇ of the meter delivery-chamber. The fluid-seal chamber extends nearly up to the top of the partition 2 and contains a charge of mercury or other suitable sealing fluid, which is supplied to it through a pipe 3ᵈ, leading into its lower end. To prevent chattering of the shell 9ᵈ in the fluid-seal chamber, a ring 9ᵉ of slightly less width than that of the chamber may be secured upon its lower end. A cylindrical diaphragm 12 of flexible material, connected at its opposite ends to the plate 9 9ª or to the shell 9ᵈ and to the wall of the inlet or the meter delivery chamber, as shown in Fig. 2, would perform the same function as and constitute the mechanical equivalent of the shell and fluid-seal chamber above described and may be substituted therefor in the discretion of the constructor without departure from the spirit and operative principle of my invention.

In the operation of the meter the entire volume of fluid which passes through the supply conduit or main enters the inlet-chamber 3 through the inlet-passage 3ª, and a determined portion of said fluid passes into the tally-meter 8 through the supply-pipe 8ª and after being measured and its volume recorded by the tally-meter passes therefrom into the meter delivery-chamber 8ᵇ, in which its delivery-pressure as reduced by the friction of the tally-meter is exerted upon the inner portion 9 of the pressure-plate 9 9ª and its central cylinder 9ᵇ in opposition to the gravity of the combined valve and motor structure and the connected shell 9ᵈ. The pressure of the measured fluid on the inner portion 9 of the pressure-plate 9 9ª, acting in conjunction with that of the unmeasured fluid on the outer pressure-plate section 9ª, overcomes said opposing gravity and raises the combined valve and motor structure, thereby opening communication between the meter delivery-chamber and the outlet-chamber for the measured fluid through the ports 9ᶜ and 10ᶜ in the valve-cylinder 9ᵇ and its bushing 10ᵇ and between the inlet-chamber and the outlet-chamber for the unmeasured fluid through the opening in the partition 2, controlled by the outer portion 9ª of the plate 9ª 9. The upward traverse of the combined valve and motor structure is limited by the stop 7, with which the top of the valve-cylinder 9ᵇ comes in contact at the limit of its upward movement.

It will be seen that variations of supply-pressure and of tally-meter resistance will, by reason of the coincident variations of the resultants of the opposing actions of pressure and gravity upon the combined valve and motor structure, correspondingly vary the degree of opening of the connected and coincidently-moving valves for the measured and unmeasured fluid without impairing the determined ratio of relative volumes of measured and unmeasured fluid upon which the accuracy of the meter necessarily depends, or, otherwise stated, that a constant ratio of drop or reduction in pressure through the delivery-ports of the measured and unmeasured fluid is maintained throughout the operation of the meter. Thus if the supply-pressure should become reduced or the frictional resistance of the tally-meter be increased the conjoined upwardly-acting pressures on the pressure-plates will be coincidently reduced, and the port areas for the passage of the measured and unmeasured fluid will be correspondingly reduced by the preponderant action of gravity on the combined valve and motor structure. If, on the other hand, the supply-pressure should be increased or the frictional resistance of the tally-meter be reduced, the conjoined upwardly-acting pressures on the pressure-plates will be coincidently increased and the port areas for the passage of measured and unmeasured fluid will be correspondingly increased by the preponderant action of the increased upwardly-acting pressures over that of gravity.

A substantial feature of structural advantage of my improvement consists in its simplicity, compactness, and inexpensiveness, and its operative efficiency is materially promoted by the entire elimination of the linkages and other articulated connections which have heretofore been employed in appliances of the class to which my invention relates.

I claim as my invention and desire to secure by Letters Patent—

1. In a proportional meter, a combined valve and motor structure comprising a valve controlling the flow of unmeasured fluid, and constituting a pressure-plate acted upon, as to opening movement, by said fluid, a valve controlling the flow of measured fluid, and a pressure-plate subject to the pressure of the measured fluid, said valves and pressure-plate being connected in an integral structure and adapted to be coincidently actuated in one direction by the conjoined pressures of the unmeasured and measured fluid and in the opposite direction by gravity.

2. In a proportional meter, the combination of a valve controlling the flow of unmeasured fluid, a valve controlling the flow of measured fluid, and means for coincidently actuating said valves in one direction by the concurrently-acting pressures of the unmeasured and of the measured fluid, and in the opposite direction by the action of gravity.

3. In a proportional meter, the combination of a valve controlling the direct passage of unmeasured fluid from the inlet to the outlet chamber and constituting a pressure-plate acted upon, as to opening movement, by the incoming fluid, a connected pressure-plate acted upon, in the same direction, by the measured fluid, and a connected valve controlling the delivery of measured fluid, said pressure-plates and valves being subject to the action of gravity in opposition to that of pressure.

4. In a proportional meter, the combination of a casing divided into inlet and outlet chambers, each adapted for connection to a fluid-conduit, a tally-meter connected to the inlet-chamber, and a combined valve and motor structure comprising a valve controlling the direct flow of fluid from the inlet to the outlet chamber and constituting a pressure-plate acted upon, as to opening movement, by the fluid in the inlet-chamber, a valve controlling the flow of fluid from the tally-meter to the outlet-chamber, and a pressure-plate acted upon, in direction to open said valve, by fluid delivered from the tally-meter, said valves and pressure-plate being rigidly connected and subject to the action of gravity in direction to impart closing movement to the valves.

5. In a proportional meter, the combination of a casing divided by a partition having a central opening into inlet and outlet chambers, each adapted for connection to a fluid-conduit, a meter delivery-chamber, a tally-meter having its delivery end connected to and communicating with the meter delivery-chamber and its receiving end communicating with the inlet-chamber, a plate extending over the top of the meter delivery-chamber and the opening in the partition of the casing and constituting a valve which controls said opening and connected pressure-plates subject to the pressure of fluid in the inlet and meter delivery chambers, a valve connected to said plate and controlling communication between the meter delivery and outlet chambers, and means for preventing communication, other than as governed by the tally-meter, between the meter delivery and inlet chambers.

HORACE CHRISMAN.

Witnesses:
J. SNOWDEN BELL,
CLARENCE A. WILLIAMS.